United States Patent
Cavalieri et al.

(10) Patent No.: US 11,981,799 B2
(45) Date of Patent: May 14, 2024

(54) COMPOSITIONS OBTAINED FROM RECYCLED POLYOLEFINS

(71) Applicant: BASELL POLIOLEFINE ITALIA S.R.L., Milan (IT)

(72) Inventors: Claudio Cavalieri, Ferrara (IT); Monica Galvan, Ferrara (IT)

(73) Assignee: Basell Poliolefine Italia S.r.l., Milan (IT)

(*) Notice: Subject to any disclaimer, the term of this patent is extended or adjusted under 35 U.S.C. 154(b) by 472 days.

(21) Appl. No.: 17/438,755

(22) PCT Filed: Feb. 20, 2020

(86) PCT No.: PCT/EP2020/054422
§ 371 (c)(1),
(2) Date: Sep. 13, 2021

(87) PCT Pub. No.: WO2020/182436
PCT Pub. Date: Sep. 17, 2020

(65) Prior Publication Data
US 2022/0153975 A1 May 19, 2022

(30) Foreign Application Priority Data
Mar. 12, 2019 (EP) .................. 19162075

(51) Int. Cl.
*C08L 23/12* (2006.01)

(52) U.S. Cl.
CPC ......... *C08L 23/12* (2013.01); *C08L 2205/025* (2013.01); *C08L 2205/035* (2013.01); *C08L 2207/20* (2013.01)

(58) Field of Classification Search
CPC .... C08F 210/08; C08F 210/06; C08F 210/02; C08F 2500/12; C08F 2500/17; C08F 2500/27; C08L 23/06; C08L 23/12; C08L 2203/16
See application file for complete search history.

(56) References Cited

U.S. PATENT DOCUMENTS

| | | | |
|---|---|---|---|
| 4,399,054 A | 8/1983 | Ferraris et al. | |
| 2012/0171393 A1* | 7/2012 | de Palo | E01C 13/08 428/17 |
| 2017/0044359 A1* | 2/2017 | Kahlen | C08F 210/06 |

FOREIGN PATENT DOCUMENTS

| | | | | |
|---|---|---|---|---|
| CN | 1230567 A | 10/1999 | | |
| CN | 101341011 A | 1/2009 | | |
| CN | 106232707 A | 12/2016 | | |
| CN | 106488953 A | 3/2017 | | |
| CN | 107805340 A | 3/2018 | | |
| CN | 107922644 A | 4/2018 | | |
| CN | 108350242 A | 7/2018 | | |
| CN | 109071896 A | 12/2018 | | |
| EP | 0045977 A2 | 2/1982 | | |
| EP | 0361493 A1 | 4/1990 | | |
| EP | 592852 A1 * | 4/1994 | ............. | C08L 23/04 |
| EP | 0728769 A1 | 8/1996 | | |
| WO | 2007071494 A1 | 6/2007 | | |
| WO | WO-2007071494 A1 * | 6/2007 | ......... | B29B 17/0042 |
| WO | WO-2009101124 A1 * | 8/2009 | ............ | C08F 210/16 |
| WO | 2013075241 A1 | 5/2013 | | |
| WO | 2015169690 A1 | 11/2015 | | |
| WO | WO-2017202600 A1 * | 11/2017 | .......... | C08L 23/0815 |

OTHER PUBLICATIONS

Wei Zhu et al., Modification of PP/HDPE Blends by PP-PE Sequential Polymerization Product; Journal of Applied Polymer Science, (1995), vol. 58, pp. 515-521.

Huggins, M.L., The Viscosity of Dilute Solutions of Long-Chain Molecules. IV. Dependence on Concentration; J. Am. Chem. Soc., (1942), vol. 64, p. 2716.

M. Kakugo et al., "Carbon-13 NMR Determination of Monomer Sequence Distribution in Ethylene-Propylene Copolymers Prepared with ?- TiCl3-Al(C2H5)2Cl", Macromolecules, (1982), vol. 15, pp. 1150-1152, XP001172897 DOI:http://dx.doi.org/10.1021/ma00232a037.

* cited by examiner

*Primary Examiner* — Mark S Kaucher

(57) ABSTRACT

A polyolefin composition made from or containing:

T1) 50-90 wt % of a recycled polyolefin mixture and

T2) 10-50 wt % of a polyolefin component, containing

A) 5-35% by weight of a propylene homopolymer or a propylene ethylene copolymer;

B) 20-50% by weight of an ethylene homopolymer; and

C) 30-60% by weight of a terpolymer of ethylene, propylene, and 1-butene made from or containing 45 to 65 percent by weight of ethylene units and from 15 to 38 percent by weight of 1-butene units.

15 Claims, No Drawings

COMPOSITIONS OBTAINED FROM RECYCLED POLYOLEFINS

This application is the U.S. National Phase of PCT International Application PCT/EP2020/054422, filed Feb. 20, 2020, claiming benefit of priority to European Patent Application No. 19162075.6, filed Mar. 12, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to compositions obtained from recycled polyolefins mixtures.

BACKGROUND OF THE INVENTION

Polyolefins are consumed for applications including packaging for food and other goods, fibers, automotive components, and manufactured articles. The quantity of polyolefins raises concerns for the environmental impact of the waste materials generated after the first use of the polyolefins.

Waste plastic materials are coming from differential recovery of municipal plastic wastes. In some instances, municipal plastic waste includes flexible packaging (cast film, blown film and BOPP film), rigid packaging, blow-molded bottles and injection-molded containers. Through a step of separation from other polymers, polyolefin fractions are obtained. The polyolefin fractions include polyethylene and polypropylene polymers. In some instances, the polyethylene polymers are HDPE, LDPE, or LLDPE. In some instances, the polypropylene polymers are homopolymers, random copolymers, or heterophasic copolymers.

A challenge in polyolefin recycling is separating quantitatively polypropylene (PP) and polyethylene (PE). In some instances, commercial recyclates from post-consumer waste (PCW) sources contain mixtures of PP and PE, wherein the minor component is up to <50 wt %.

In some instances, the recycled PP/PE-blends suffer from deteriorated mechanical and optical properties, poor performance in odor and taste, and poor compatibility between the polymer phases, thereby adversely affecting impact strength and heat deflection resistance. It is believed that the performance is partly caused by PE, having lower stiffness and melting point, forming the continuous phase, even when PP concentrations are up to 65%. It is further believed that PE forms the continuous phase because the PE components in PCW have higher viscosity than the PP components.

In some instances, the recycled PP/PE-blends are excluded from use in high quality parts. Alternatively, the recycled PP/PE-blends are used in low-cost and non-demanding applications.

SUMMARY OF THE INVENTION

In a general embodiment, the present disclosure provides a polyolefin composition made from or containing:
T1) 50-90 wt % of a recycled polyolefin mixture containing from 90 wt % to 50 wt % of propylene derived units and from 5 wt % to 40 wt % of ethylene derived units optionally containing up to 15 wt % of olefin derived units selected from the group consisting of 1-butene, 1-hexene, and 1-octene; wherein the mixture has:
i) a fraction soluble in xylene at 25° C. from 5 wt % to 30 wt %;
ii) an intrinsic viscosity [η] (measured in tetrahydronaphthalene at 135° C.) of the xylene soluble fraction at 25° C. between 0.5 to 4.0 dl/g;
iii) a melt flow rate (230° C./2.16 kg) between 1 to 50 g/10 min; and
iv) a melting point measured by DSC from 148° C. to 162° C.; and
T2) 10-50 wt % of a polyolefin component containing:
A) 5-35% by weight of a propylene homopolymer or a propylene ethylene copolymer containing 90% by weight or more of propylene units; component A) containing 10% by weight or less of a fraction soluble in xylene at 25° C. (XSA), both the amount of propylene units and the fraction XSA being referred to the weight of A);
B) 20-50% by weight of an ethylene homopolymer having 5% by weight or less of a fraction soluble in xylene at 25° C. ($XS_B$), the amount of the fraction $XS_B$ being referred to the weight of (B); and
C) 30-60% by weight of a terpolymer, wherein the terpolymer contains ethylene, propylene and 1-butene derived units containing from 45% to 65% by weight of ethylene units and from 15% to 38% by weight of 1-butene units; and component C) containing from 30% to 85% by weight of a fraction soluble in xylene at 25° C. ($XS_C$), the amount of ethylene units, the 1-butene units and the fraction $XS_C$ being referred to the weight of (C);
the sum of the amounts of (A), (B) and (C) being referred to the total weight of (A), (B) and (C), being 100;
the sum of the amount of T1) and T2), being referred to the total weight of T1) and T2), being 100.

DETAILED DESCRIPTION OF THE INVENTION

In some embodiments, the present disclosure provides a polyolefin composition made from or containing:
T1) 50-90 wt %, alternatively 60-80 wt %; alternatively from 65 wt % to 75 wt %, of a recycled polyolefin mixture containing from 90 wt % to 50 wt % of propylene derived units and from 5 wt % to 40 wt % of ethylene derived units optionally containing up to 15 wt % of olefin derived units selected from the group consisting of 1-butene, 1-hexene, and 1-octene; wherein the mixture has:
i) a fraction soluble in xylene at 25° C. from 5 wt % to 30 wt %; alternatively from 6 wt % to 15 wt %;
ii) an intrinsic viscosity [η] (measured in tetrahydronaphthalene at 135° C.) of the xylene soluble fraction at 25° C. between 0.5 to 4.0 dl/g, alternatively between 0.8 to 3.0 dl/g; alternatively between 1.0 to 2.5 dl/g;
iii) a melt flow rate (230° C./2.16 kg) between 1 to 50 g/10 min; alternatively between 4 to 30 g/10 min; alternatively between 6 to 20 g/10 min; and
iv) a melting point measured by DSC from 148° C. to 162° C.; alternatively from 150° C. to 160° C.; alternatively from 155° C. to 159° C.;
T2) 50-10 wt % alternatively 40-20 wt %; alternatively from 35 wt % to 25 wt %, of a polyolefin component containing:
A) 5-35% by weight; alternatively 10-30% by weight; alternatively 15-23% by weight, of a propylene homopolymer or a propylene ethylene copolymer containing 90% by weight or more, alternatively 95% by weight or more; alternatively 97% by weight or more, of propylene units; component A) containing 10% by weight or less, alternatively 8 wt % or less, alternatively 6 wt % or less, of a fraction soluble in xylene at 25° C. ($XS_A$), both the amount of propylene units and of the fraction $XS_A$ being referred to the weight of A);

B) 20-50% by weight; alternatively 25-45% by weight; alternatively 30-40% by weight, of an ethylene homopolymer having 5% by weight or less; alternatively 4 wt % or less; alternatively 3 wt % or less, of a fraction soluble in xylene at 25° C. ($XS_B$), the amount of the fraction $XS_B$ being referred to the weight of (B); and C) 30-60% by weight; alternatively 35-55% by weight; alternatively 40-50% by weight, of a terpolymer of ethylene, propylene and 1-butene containing from 45% to 65% by weight, alternatively from 48% to 62% by weight; alternatively from 50% to 60% by weight, of ethylene units; and from 15% to 38%; alternatively from 18% to 33% by weight, alternatively from 20% to 30% by weight, of 1-butene units; and containing from 30% to 85%; alternatively from 35% to 50% by weight, of a fraction soluble in xylene at 25° C. ($XS_C$), the amount of ethylene units, the 1-butene units, and the fraction $XS_C$ being referred to the weight of (C);

the sum of the amounts of (A), (B) and (C) being referred to the total weight of (A), (B) and (C), being 100;

the sum of the amount of T1) and T2), being referred to the total weight of T1) and T2), being 100;

In some embodiments, component T1) is a mixture of recycled polypropylene and polyethylene blend. In some embodiments, component T1) has a tensile modulus from 500 MPa to 1800 MPa; alternatively from 900 MPa to 1500 MPa.

In some embodiments, component T1) has an elongation at break from 20% to 200%; alternatively from 30% to 100%.

In some embodiments, component T1) has a tensile stress at break from 9 MPa to 30 MPa, alternatively from 12 MPa to 25 MPa; alternatively from 13 MPa to 20 MPa.

In some embodiments, component (A) is a propylene homopolymer. In some embodiments, component (A) has a melt flow rate (230° C./2.16 kg) between 50 to 200 g/10 min; alternatively between 80 to 170 g/10 min.

In some embodiment, the ethylene homopolymer (B) contains up to 5% by weight, alternatively up to 3% by weight, of comonomer units. In some embodiments, the comonomer units are derived from one or more comonomers selected from the group consisting of $C_3$ to $C_8$ alpha-olefins. In some embodiments, the alpha-olefin comonomers are selected from the group consisting of propylene, butene-1, pentene-1, 4-methylpentene-1, hexene-1 and octene-1, alternatively propylene or 1-butene. In some embodiments, the ethylene homopolymer (B) does not contain additional comonomer units.

In some embodiments, the ethylene homopolymer (B) has a melt flow rate (230° C./2.16 kg) between 0.1 to 50 g/10 min., alternatively between 0.1 to 30 g/10 min; alternatively between 0.1 to 10 g/10 min.

In some embodiments, the ethylene homopolymer (B) has a density (determined according to ISO 1183 at 23° C.) of from 0.940 to 0.965 g/cm³.

In some embodiments, components (A)+(B) blended together have a melt flow rate (230° C./2.16 kg) between 0.1 to 70 g/10 min., alternatively between 1 to 50 g/10 min; alternatively between 8 to 40 g/10 min.

In some embodiments, the polyolefin composition (A)+(B)+(C) has a melt flow rate (230° C./2.16 kg) between 0.5 to 25 g/10 min., alternatively from 0.8 to 20.0 g/10 min; alternatively from 1.0 to 18.0 g/10 min.

In some embodiments, the xylene soluble fraction at 25° C. of the polyolefin composition (A+B+C) has an intrinsic viscosity [η] (measured in tetrahydronaphthalene at 135° C.) between 2.4 to 3.5 dl/g, alternatively between 2.5 to 3.3 dl/g.

As used herein, the term "copolymer" refers to a polymer containing two kinds of comonomers, such as propylene and ethylene or ethylene and 1-butene. As used herein, the term "terpolymer" refers to a polymer containing three kinds of comonomers, such as propylene, ethylene and 1-butene.

In some embodiments, polyolefin composition T2) is prepared by a sequential polymerization, including at least three sequential steps, wherein components (A), (B) and (C) are prepared in separate subsequent steps, operating in each step, except the first step, in the presence of the polymer formed and the catalyst used in the preceding step. In some embodiments, the catalyst is added in the first step and not in subsequent steps. In some embodiments, the catalyst remains active for the subsequent steps.

In some embodiments, the polymerization is a continuous process. In some embodiments, the polymerization is a batch process. In some embodiments, the polymerization is carried out in liquid phase, in the presence or not of inert diluent, or in gas phase, or by mixed liquid-gas techniques. In some embodiments, the polymerization is carried out in gas phase.

In some embodiments, the temperature for the polymerization steps is from 50 to 100° C. In some embodiments, the pressure is atmospheric or higher.

In some embodiments, the molecular weight is regulated. In some embodiments, the molecular weight regulator is hydrogen.

In some embodiments, the polymerizations are carried out in the presence of a Ziegler-Nana catalyst. In some embodiments, a Ziegler-Natta catalyst is made from or containing the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from the group consisting of compounds of Ti, V, Zr, Cr and Hf. In some embodiments, the transition metal compound is supported on $MgCl_2$.

In some embodiments, the catalysts are made from or containing the product of the reaction of the organometallic compound of group 1, 2 or 13 of the Periodic Table of elements, with a solid catalyst component made from or containing a Ti compound and an electron donor compound supported on $MgCl_2$.

In some embodiments, the organometallic compounds are aluminum alkyl compounds.

In some embodiments, the polymer composition B) is obtained by using a Ziegler-Natta polymerization catalyst, alternatively a Ziegler-Natta catalyst supported on $MgCl_2$, alternatively a Ziegler-Natta catalyst made from or containing the product of reaction of:

1) a solid catalyst component made from or containing a Ti compound and an electron donor (internal electron-donor) supported on $MgCl_2$;
2) an aluminum alkyl compound (cocatalyst); and, optionally,
3) an electron-donor compound (external electron-donor).

In some embodiments, the solid catalyst component (1) contains, as an electron donor, a compound selected from the group consisting of ethers, ketones, lactones, compounds containing N, P and/or S atoms, and mono- and dicarboxylic acid esters.

In some embodiments, the catalysts are as described in U.S. Pat. No. 4,399,054 and European Patent No. 45977.

In some embodiments, the electron-donor compounds are selected from the group consisting of phthalic acid esters and succinic acid esters. In some embodiments, the phthalic acid ester is diisobutyl phthalate.

In some embodiments, the succinic acid esters are represented by the formula (I):

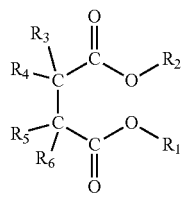

(I)

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms. In some embodiments, the radicals $R_3$ to $R_6$ are joined to the same carbon atom and linked together to form a cycle.

In some embodiments, $R_1$ and $R_2$ are $C_1$-$C_8$ alkyl, cycloalkyl, aryl, arylalkyl and alkylaryl groups. In some embodiments, $R_1$ and $R_2$ are selected from primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl and alkylaryl radical having from 3 to 10 carbon atoms. In some embodiments, at least two radicals from $R_3$ to $R_6$ are different from hydrogen and selected from $C_1$-$C_{20}$ linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, $R_3$ and $R_5$ are different from hydrogen and linked to different carbon atoms. In some embodiments, $R_4$ and $R_6$ are different from hydrogen and linked to different carbon atoms.

In some embodiments, the electron-donors are the 1,3-diethers described in European Patent Application Nos. EP-A-361 493 and 728769.

In some embodiments, cocatalysts (2) are trialkyl aluminum compounds. In some embodiments, the trialkyl aluminum compounds are selected from the group consisting of Al-triethyl, Al-triisobutyl and Al-tri-n-butyl.

In some embodiments, the electron-donor compounds (3) used as external electron-donors (added to the Al-alkyl compound) are selected from the group consisting of aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine.

In some embodiments, the silicon compounds have the formula $R^1_a R^2_b Si(OR^3)_c$, where a and b are integer numbers from 0 to 2, c is an integer from 1 to 3 and the sum (a+b+c) is 4; $R^1$, $R^2$ and $R^3$ are alkyl, cycloalkyl or aryl radicals with 1-18 carbon atoms optionally containing heteroatoms.

In some embodiments, the silicon compounds are selected from the group consisting of (tert-butyl)$_2$Si(OCH$_3$)$_2$, (cyclohexyl)(methyl)Si (OCH$_3$)$_2$, (phenyl)$_2$Si(OCH$_3$)$_2$ and (cyclopentyl)$_2$Si(OCH$_3$)$_2$.

In some embodiments, the 1,3-diethers are used as external donors. In some embodiments, the internal donor is a 1,3-diether and the external donor is omitted.

In some embodiments, the catalysts are precontacted with small quantities of olefin (prepolymerization), maintaining the catalyst in suspension in a hydrocarbon solvent, and polymerizing at temperatures from room to 60° C., thereby producing a quantity of polymer from 0.5 to 3 times the weight of the catalyst.

In some embodiments, the operation takes place in liquid monomer, producing a quantity of polymer up to 1000 times the weight of the catalyst.

The use of component T2) in the composition of the present disclosure make possible to increase the poor tensile performance of component T1) so that it can be recycled in a more valuable applications such as injection moulding articles.

The following examples are given to illustrate, but not limit the present disclosure.

EXAMPLES

Characterizations
  Xylene-Soluble (XS) Fraction at 25° C.
  Solubility in xylene: Determined as follows:
  2.5 g of polymer and 250 ml of xylene were introduced into a glass flask equipped with a refrigerator and a magnetic stirrer. The temperature was raised in 30 minutes up to the boiling point of the solvent. The resulting clear solution was then kept under reflux and stirred for 30 minutes. The closed flask was then kept for 30 minutes in a bath of ice and water, then in a thermostatic water bath at 25° C. for 30 minutes. The resulting solid was filtered on quick filtering paper. 100 ml of the filtered liquid were poured in a pre-weighed aluminum container, which was heated on a heating plate under nitrogen flow, thereby removing the solvent by evaporation. The container was then kept in an oven at 80° C. under vacuum until a constant weight was obtained. The weight percentage of polymer soluble in xylene at room temperature was then calculated.

The content of the xylene-soluble fraction is expressed as a percentage of the original 2.5 grams and then, by the difference (complementary to 100%), the xylene insoluble percentage (%);

XS of components B) and C) were calculated by using the formula:

$$XS_{tot} = W_a XS_A + WbXS_B + WcXS_C$$

wherein Wa, Wb and Wc were the relative amount of components A, B and C, respectively, and (A+B+C=1).

Melt Flow Rate (MFR)
Measured according to ISO 1133 at 230° C. with a load of 2.16 kg, unless otherwise specified.

Tensile Modulus

The Tensile Modulus was measured according to ISO 527-2, and ISO 1873-2 on injection-molded samples.

Tensile Strength at Yield; Tensile Strength at Break; Elongation at Break; Elongation at Yield Tensile strength at yield; tensile strength at break; elongation at break; and elongation at yield were measured according to according to ISO 527-2 and ISO 1873-2 on injection-molded samples.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket; this setup allowed for temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine [η].

Comonomer ($C_2$ and $C_4$) Content

The content of comonomers was determined by infrared (IR) spectroscopy by collecting the IR spectrum of the sample vs. an air background with a Fourier transform infrared spectrometer (FTIR). The instrument data acquisition parameters were:

purge time: 30 seconds minimum
collect time: 3 minutes minimum
apodization: Happ-Genzel
resolution: 2 $cm^{-1}$.

Sample Preparation—Using a hydraulic press, a thick sheet was obtained by compression molding about 1 g of sample between two aluminum foil sheets. A small portion was cut from the resulting sheet to mold a film. The film thickness was set to have a maximum absorbance of the $CH_2$ absorption band at ~720 $cm^{-1}$ of 1.3 a.u. (% Transmittance>5%). The molding conditions were carried out at a temperature of about 180±10° C. (356° F.) and a pressure of about 10 $kg/cm^2$ (142.2 psi) for about one minute. The pressure was then released. The sample was removed from the press and cooled to room temperature. The spectrum of the pressed film sample was recorded as a function of absorbance vs. wavenumbers ($cm^{-1}$). The following measurements were used to calculate ethylene ($C_2$) and 1-butene ($C_4$) contents:

a) Area ($A_t$) of the combination absorption bands between 4482 and 3950 $cm^{-1}$, which was used for spectrometric normalization of film thickness.
b) Area ($A_{C2}$) of the absorption band due to methylenic sequences ($CH_2$ rocking vibration) in a range of 660-790 $cm^{-1}$ after a proper digital subtraction of an isotactic polypropylene (IPP) and a $C_2C_4$ references spectrum.
c) The factor of subtraction ($FCR_{C4}$) between the spectrum of the polymer sample and the $C_2C_4$ reference spectrum: The reference spectrum was obtained by performing a digital subtraction of a linear polyethylene from a $C_2C_4$ copolymer to extract the $C_4$ band (ethyl group at ~771 $cm^{-1}$).

The ratio $A_{C2}/A_t$ was calibrated by analyzing ethylene-propylene standard copolymers of compositions, as determined by NMR spectroscopy.

The assignments of the spectra, triad distribution and composition were made according to Kakugo ("Carbon-13 NMR determination of monomer sequence distribution in ethylene-propylene copolymers prepared with δ-titanium trichloride-diethylaluminum chloride," M. Kakugo, Y. Naito, K. Mizunuma and T. Miyatake, *Macromolecules*, 1982, 15, 1150).

To calculate the ethylene ($C_2$) and 1-butene ($C_4$) content, calibration curves were obtained by using reference samples of ethylene and 1-butene that were detectable by $^{13}C$ NMR.

Calibration for ethylene—A calibration curve was obtained by plotting $A_{C2}/A_t$ versus ethylene molar percent (% $C_{2m}$), and the coefficients $a_{C2}$, $b_{C2}$ and $C_{C2}$ were then calculated via linear regression.

Calibration for 1-butene—A calibration curve was obtained by plotting $FCR_{C4}/A_t$ versus butane molar percent (% $C_{4m}$), and the coefficients $a_{C4}$, $b_{C4}$ and $C_{C4}$ were then calculated via linear regression.

The spectra of the samples were recorded and then ($A_t$), ($A_{C2}$) and ($FCR_{C4}$) were calculated.

The ethylene content (% molar fraction $C_{2m}$) of the sample was calculated as follows:

$$\%C2m = -b_{C2} + \frac{\sqrt{b_{C2}^2 - 4 \cdot a_{C2} \cdot \left(c_{C2} - \frac{A_{C2}}{A_t}\right)}}{2 \cdot a_{C2}}$$

The 1-butene content (% molar fraction $C_{2m}$) of the sample was calculated as follows:

$$\%C4m = -b_{C4} + \frac{\sqrt{b_{C4}^2 - 4 \cdot a_{C4} \cdot \left(c_{C4} - \frac{FCR_{C4}}{A_t}\right)}}{2 \cdot a_{C4}}$$

where $a_{C4}$, $b_{C4}$, $c_{C4}$, $a_{C2}$, $b_{C2}$, $c_{C2}$ were the coefficients of the two calibrations.

Changes from mol % to wt % were calculated by using molecular weights of the compound(s).

Amount (wt %) of comonomer of components A-C were calculated by using the following relationship:

$$Com_{tot} = WaCom_A + WbCom_B + WcCom_C$$

wherein Wa, Wb and Wc were the relative amount of components A, B and C, respectively, and (A+B+C=1).

$Com_{tot}$, $Com_A$, $Com_B$ and $Com_C$ were the amounts of comonomer in the total composition (tot) and components A-C.

Melting Point

The melting point was measured by using a DSC instrument according to ISO 11357-3, at scanning rate of 20C/min both in cooling and heating, on a sample of weight between 5 and 7 mg., under inert N2 flow. Instrument calibration was made with Indium.

Preparation of Component T2

Example 1

Preparation of the Polyolefin Composition

Catalyst Precursor:

The solid catalyst component used in the polymerization was a Ziegler-Natta catalyst component supported on magnesium chloride ($MgCl_2$) containing titanium and diisobutylphthalate as an internal donor. An initial amount of microspheroidal $MgCl_2 \cdot 2.8C_2H_5OH$ was prepared according to Example 2 of U.S. Pat. No. 4,399,054, but operating at 3,000 rpm instead of 10,000 rpm. The resulting adduct was subjected to thermal dealcoholation at increasing temperatures from 30-130° C. in a nitrogen current until the molar alcohol content per mol of Mg was about 1.16. Into a 1000 mL four-necked round flask, purged with nitrogen, 500 mL of $TiCl_4$ were introduced at 0° C. While stirring, 30 grams of the microspheroidal $MgCl_2 \cdot 1.16C_2H_5OH$ adduct were added. The temperature was raised to 120° C. and maintained for 60 minutes. During the temperature increase, an amount of diisobutylphthalate was added to produce a Mg/diisobutylphthalate molar ratio of about 18. After 60 minutes, the stirring was stopped, the liquid was siphoned off, and the treatment with $TiCl_4$ was repeated at 100° C. for 1 hour in the presence of an amount of diisobutylphthalate to produce a Mg/diisobutylphthalate molar ratio of about 27. The stirring was stopped. The liquid was siphoned off, and the treatment with $TiCl_4$ was repeated at 100° C. for 30 min. After sedimentation and siphoning at 85° C., the solid was washed six times with anhydrous hexane (6×100 ml) at 60° C.

Catalyst System and Prepolymerization

Before introducing the solid catalyst component into the polymerization reactors, the solid catalyst component was contacted at 30° C. for 9 minutes with aluminum triethyl (TEAL) and dicyclopentyldimethoxysilane (DCPMS) at a TEAL/DCPMS weight ratio of about 15 and in such a quantity that the TEAL/solid catalyst component weight ratio was about 4.

The catalyst system was then subjected to prepolymerization by suspending the catalyst system in liquid propylene at 50° C. for about 75 minutes before introducing the catalyst system into the first polymerization reactor.

Polymerization

The polymerization was carried out in continuous mode in a series of three gas-phase reactors equipped with devices to transfer the product from the first reactor to the second reactor. A propylene-based polymer (A) was produced in the first gas phase polymerization reactor by feeding the prepolymerized catalyst system, hydrogen (the molecular weight regulator) and propylene, with the components in a gas state, in a continuous and constant flow. The propylene-based polymer (A) coming from the first reactor was discharged in a continuous flow and, after having been purged of unreacted monomers, introduced, in a continuous flow, into the second gas phase reactor, together with quantitatively constant flows of hydrogen and ethylene, with the components in a gas state. In the second reactor, a copolymer of ethylene (B) was produced. The product coming from the second reactor was discharged in a continuous flow and, after having been purged of unreacted monomers, introduced, in a continuous flow, into the third gas phase reactor, together with quantitatively constant flows of hydrogen, ethylene and propylene, with the components in a gas state. In the third reactor, an ethylene-propylene polymer (C) was produced. Polymerization conditions, molar ratio of the reactants and compositions of the resulting copolymers are shown in Table 1. The polymer particles exiting the third reactor were subjected to a steam treatment to remove the reactive monomers and volatile substances and then dried. Thereafter, the polymer particles were mixed with a stabilizing additive composition in a twin screw extruder Berstorff ZE 25 (length/diameter ratio of screws: 34) and extruded under a nitrogen atmosphere in the following conditions:

Rotation speed: 250 rpm;

Extruder output: 15 kg/hour;

Melt temperature: 245° C.

The stabilizing additive composition was made from or containing the following components:

0.1% by weight of Irganox® 1010;

0.1% by weight of Irgafos® 168; and 0.04% by weight of DHT-4A (hydrotalcite);

where the percentage amounts refer to the total weight of the polymer and stabilizing additive composition.

Irganox® 1010 was 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzene-propanoate, and Irgafos® 168 was tris(2,4-di-tert.-butylphenyl)phosphite. The characteristics of the polymer composition, reported in Table 2, were obtained from measurements carried out on the extruded polymer, which constituted a stabilized ethylene polymer composition.

Polymerization conditions, molar ratio of the reactants and compositions of the resulting copolymers are shown in Table 1.

TABLE 1

| Polymerization conditions | | |
| --- | --- | --- |
| Example | | Example 1 |
| 1$^{st}$ Reactor - component (A) | | |
| Temperature | ° C. | 60 |
| Pressure | barg | 16 |
| $H_2/C_{3\_}$ | mol. | 0.16 |
| Split | wt % | 20 |
| Xylene soluble of (A) ($XS_A$) | wt % | 4.6 |
| 2$^{nd}$ Reactor - component (B) | | |
| Temperature | ° C. | 80 |
| Pressure | barg | 18 |
| $H_2/C_{2\_}$ | mol. | 1.04 |
| $C_{2\_}/(C_{2\_} + C_{3\_})$ | mol. | 0.96 |
| Split | wt % | 35 |
| 3$^{rd}$ Reactor - component (C) | | |
| Temperature | ° C. | 67 |
| Pressure | barg | 16 |
| $H_2/C_{2\_}$ | mol. | 0.16 |
| $C_{3\_}/(C_{2\_} + C_{3\_})$ | mol. | 0.42 |
| $C_{4\_}/(C_{2\_} + C_{4\_})$ | | 0.41 |
| Split | wt % | 45 |

Notes:
$C_{2\_}$ = ethylene (IR); $C_{3\_}$ = propylene (IR); $C_{4\_}$ = 1-butene (IR); split = amount of polymer produced in the concerned reactor.
* Calculated values.

The features of the polymer of Example 1 are reported in Table 2.

TABLE 2

| Example | | 1 |
|---|---|---|
| component A | | |
| $C_2$ content | wt % | 0 |
| XSA | wt % | 4.6 |
| MFR | g/10 min | 110 |
| split | wt % | 20 |
| component B | | |
| XSB* | wt % | 1.7 |
| $C_2$ content* | wt % | 100 |
| split | wt % | 35 |
| MFR | g/10 min | 17.4 |
| Component C | | |
| XSC* | wt % | 39.5 |
| $C_2$ content* | wt % | 55.0 |
| $C_4$ content* | wt % | 23 |
| split | wt % | 45 |
| total composition | | |
| MFR | g/10 min | 0.9 |
| IV on soluble in Xylene at 25° C. | dl/g | 2.75 |

$C_2$ = ethylene;
$C_4$ = 1-butene;
*calculated

T1 Component

T1 component was recycled PP from post-consumer waste and resulted in a mixture of polypropylene and polyethylene polymers. Features of T1 are reported in Table 3.

TABLE 3

| | | T1 |
|---|---|---|
| Melt flow rate (230° C./2.16 kg) | g/10 min | 10.2 |
| Ethylene content | Wt % | 12.0 |
| Xylene solubles at 25° C. XS | % | 10.9 |
| Intrinsic viscosity of XS | dl/g | 1.57 |
| Melting point | ° C. | 158.9 |
| Tensile modulus | MPa | 1170 |
| Tensile stress @ yield | MPa | 26.3 |
| Elongation @ yield | % | 9.8 |
| Tensile stress @break | MPa | 17.2 |
| Elongation @break | % | 54 |

To component T1, Irganox 1010 (90 ppm); Irganox 1076 (<20 ppm); Irganox 1024 (100 ppm); and Irgafos 168 (200 ppm) were added.

T1 component was blended with 30 wt % of propylene based copolymers. The properties of the resulting compositions are reported in Table 4.

TABLE 4

| Ex | | Comp 1 | Ex 1 | Comp 3 | Comp 4 |
|---|---|---|---|---|---|
| T1 | Wt % | 100 | 80 | 80 | 80 |
| T2: | Wt % | | | | |
| T3 | Wt % | | 30 | | |
| CA7320 | Wt % | 0 | | 30 | |
| CA138A | Wt % | 0 | | | 30 |
| Melt flow rate (230° C./2.16 kg) | g/10 min | 10.2 | 6.9 | 6.4 | 6.8 |
| Tensile stress @ yield | MPa | 26.3. | 19 | 18.4 | 19.4 |
| Elongation @ yield | % | 9.8 | 16 | 10.8 | 8.5 |
| Tensile stress @break | MPa | 17.2 | 21.8 | 14.8 | 14.7 |
| Elongation @break | % | 54 | 600 | 290 | 45 |

CA7320: Hifax CA 7320 A was a reactor TPO (thermoplastic polyolefin), commercially available from LyondellBasell.

CA138A: Hifax™ CA138A was a thermoplastic olefin (TPO) resin, commercially available from LyondellBasell.

What is claimed is:

1. A polyolefin composition comprising:
T1) 50-90 wt % of a recycled polyolefin mixture containing from 90 wt % to 50 wt % of propylene derived units and from 5 wt % to 40 wt % of ethylene derived units optionally containing up to 15 wt % of olefins derived units selected from the group consisting of 1-butene, 1-hexene, and 1-octene; wherein the mixture has:
   i) a fraction soluble in xylene at 25° C. from 5 wt % to 30 wt %;
   ii) an intrinsic viscosity [ii] (measured in tetrahydronaphthalene at 135° C.) of the xylene soluble fraction at 25° C. between 0.5 to 4.0 dl/g;
   iii) a melt flow rate (230° C./2.16 kg) between 1 to 50 g/10 min; and
   iv) a melting point measured by DSC from 148° C. to 162° C.; and T2) 10-50 wt % of a polyolefin component containing:
A) 5-35% by weight of a propylene homopolymer or a propylene ethylene copolymer containing 90% by weight or more of propylene units; component A) containing 10% by weight or less of a fraction soluble in xylene at 25° C. (XSA), both the amount of propylene units and the fraction XSA being referred to the weight of A);
B) 20-50% by weight of an ethylene homopolymer having 5% by weight or less of a fraction soluble in xylene at 25° C. ($XS_B$), the amount of the fraction $XS_B$ being referred to the weight of (B); and
C) 30-60% by weight of a terpolymer of ethylene, propylene and 1-butene derived units containing from 45% to 65% by weight of ethylene units and from 15% to 38% by weight of 1-butene units; and component C) containing from 30% to 85% by weight of a fraction soluble in xylene at 25° C. ($XS_C$), the amount of ethylene units, the 1-butene units and the fraction $XS_C$ being referred to the weight of (C);
the sum of the amount of T1) and T2), being referred to the total weight of T1) and T2), being 100;
the sum of the amounts of (A), (B) and (C), being referred to the total weight of (A), (B), and (C), being 100.

2. The polyolefin composition according to claim 1, wherein:
Component A ranges from 10% by weight to 30% by weight;
Component B ranges from 25% by weight to 45% by weight; and
Component C ranges from 35% by weight to 55% by weight.

3. The polyolefin composition according to claim 1, wherein
Component A ranges from 15% by weight to 23% by weight;
Component B ranges from 30% by weight to 40% by weight; and
Component C ranges from 40% by weight to 50% by weight.

4. The polyolefin composition according to claim 1, wherein component A) is a polypropylene homopolymer.

5. The polyolefin composition according to claim 1, wherein component B) is an ethylene homopolymer having 4 wt % or less of a fraction soluble in xylene at 25° C. ($XS_B$).

6. The polyolefin composition according to claim 1, wherein component C) is terpolymer of ethylene, propylene and 1-butene containing from 48% to 62% by weight of ethylene units and from 18% to 33% by weight of 1-butene units.

7. The polyolefin composition according to claim 1, wherein component (A) has a melt flow rate (230° C./2.16 kg) between 50 to 200 g/10 min.

8. The polyolefin composition according to claim 1, wherein components (A)+(B) blended together have a melt flow rate (230° C./2.16 kg) between 0.1 to 70 g/10 min.

9. The polyolefin composition according to claim 1, wherein component (A) has a melt flow rate (230° C./2.16 kg) between 80 to 170 g/10.

10. The polyolefin composition according to 1, wherein component (B) has a melt flow rate (230° C./2.16 kg) between 0.1 to 30 g/10 min.

11. The polyolefin composition according to claim 1, wherein component T1) is a mixture of recycled polypropylene and polyethylene blend.

12. The polyolefin composition according to claim 1, wherein component T1) has a tensile modulus from 500 MPa to 1800 MPa.

13. The polyolefin composition according to claim 1, wherein component T1) has an elongation at break from 20% to 200%.

14. The polyolefin composition according to claim 1, wherein component T1) has a tensile stress at break ranging from 9 MPa to 30 MPa.

15. The polyolefin composition according to claim 1, wherein component T1) ranges from 60 to 80 wt % and component T2) ranges from 40 to 20 wt %.

* * * * *